(12) United States Patent
Chen et al.

(10) Patent No.: US 10,330,316 B1
(45) Date of Patent: Jun. 25, 2019

(54) FLOW CONTROL APPARATUS AND FLOW CONTROL GENERATION DEVICE THEREOF FOR GENERATING DC CONTROL SIGNAL BASED ON AUDIO SIGNAL

(71) Applicants: Chung-Yang Chen, Xindian (TW); Stephen James Paladino Paladino, Murfreesboro, TN (US); Robert John Buckley, Incline Village, NV (US)

(72) Inventors: Chung-Yang Chen, Xindian (TW); Stephen James Paladino Paladino, Murfreesboro, TN (US); Robert John Buckley, Incline Village, NV (US)

(73) Assignee: Chung-Yang Chen, New Taipei (TW)

( * ) Notice: Subject to any disclaimer, the term of this patent is extended or adjusted under 35 U.S.C. 154(b) by 0 days.

(21) Appl. No.: 15/920,935

(22) Filed: Mar. 14, 2018

(51) Int. Cl.
| | |
|---|---|
| *G06F 17/00* | (2019.01) |
| *F23N 1/00* | (2006.01) |
| *H04R 3/04* | (2006.01) |
| *F24B 1/18* | (2006.01) |
| *G05D 7/06* | (2006.01) |
| *H04R 29/00* | (2006.01) |

(52) U.S. Cl.
CPC ............ *F23N 1/005* (2013.01); *F24B 1/1808* (2013.01); *G05D 7/0635* (2013.01); *H04R 3/04* (2013.01); *H04R 29/00* (2013.01)

(58) Field of Classification Search
CPC ..... F23N 1/005; F24B 1/1808; G05D 7/0635; H04R 3/04; H04R 29/00
See application file for complete search history.

(56) References Cited

U.S. PATENT DOCUMENTS

| | | | | |
|---|---|---|---|---|
| 1,977,997 A | * | 10/1934 | Patterson | A63J 17/00 236/69 |
| 3,165,966 A | * | 1/1965 | Pribyl | A63J 17/00 239/17 |
| 4,376,404 A | * | 3/1983 | Haddad | A63J 17/00 137/624.11 |
| 5,069,387 A | * | 12/1991 | Alba | B05B 17/08 239/18 |
| 6,276,612 B1 | * | 8/2001 | Hall | B05B 17/08 239/101 |

(Continued)

*Primary Examiner* — Joseph Saunders, Jr.
(74) *Attorney, Agent, or Firm* — Muncy, Geissler, Olds & Lowe, P.C.

(57) ABSTRACT

A flow control apparatus includes a flow control signal generation device for generating a DC control signal based on an audio signal and at least one proportional valve. The flow control signal generation device includes an audio receiving module, a filter rectifier module, a microprocessor and a proportional valve control signal generation module. The filter rectifier module generates at least one DC audio signal by filtering the audio signal provided by the audio receiving module. The microprocessor generates a plurality of period attenuated values based on the DC audio signal. The proportional valve control signal generation module filters the audio signal, attenuates the signal based on the period attenuated values, and then performs filtering and rectification processing to generate the DC control signal, such that the proportional valve may control the opening ratio of the proportional valve based on the DC control signal.

12 Claims, 5 Drawing Sheets

(56) References Cited

U.S. PATENT DOCUMENTS

| | | | | |
|---|---|---|---|---|
| 6,611,114 B1 * | 8/2003 | Yen | .................. | A63J 17/00 |
| | | | | 239/16 |
| 6,717,383 B1 * | 4/2004 | Brunt | ................. | A01K 63/047 |
| | | | | 239/18 |
| 6,746,131 B1 * | 6/2004 | Goldstein | ............ | F21S 10/002 |
| | | | | 362/86 |
| 8,614,632 B1 * | 12/2013 | Wells | ................. | H05B 37/029 |
| | | | | 340/331 |

* cited by examiner

FLOW CONTROL APPARATUS AND FLOW CONTROL GENERATION DEVICE THEREOF FOR GENERATING DC CONTROL SIGNAL BASED ON AUDIO SIGNAL

BACKGROUND OF INVENTION

1. Field of the Invention

The present invention is related to a flow control apparatus and a flow control signal generation device, and more particularly is related to a flow control apparatus and a flow control signal generation device for generating a DC flow control signal based on an audio signal.

2. Description of the Prior Art

When hosting a large event such as a party, in order to drive the atmosphere of happiness, sometimes it is necessary to create some sound or light effects to attract everyone's attention, and music playing is the most common one. But in recent years, more and more people choose the performance of fire dance to energize the atmosphere.

As mentioned, the performance of fire dance is executed by using a flow controller to analyze the volume of the audio signal and control the flow of flammable gas based on the volume to have the flame changed with the volume. When the audio signal comes from a single musical instrument or human voice, the flame change of the fire dance may follow the rhythm because of the significant volume change. However, when the audio signal comes from a composition of various music instruments and human voice, the rhythm may not have a corresponding volume change, e.g. the volume is kept high, because of the mixing of the audio from the various musical instruments and the human voice. At this time, the conventional flow controller would keep a large flame but cannot deliver the rhythm of music.

SUMMARY OF THE INVENTION

The conventional flow controller controls the flow of flammable gas based on the volume of the music to cause flame change. However, when the music comes from a composition of various sounds, the rhythm change may not have a corresponding volume change such that the fire dance demonstrated by using the conventional flow controller cannot show the rhythm change to deliver the rhythm of music to the people. Accordingly, it is a main object of the present invention to provide a flow control apparatus and a flow control signal generation device for generating a direct current (DC) control signal based on an audio signal, to have the fire dance showing the change corresponding to the music rhythm.

In order to achieve the above mentioned object, the present invention provides a flow control signal generation device for generating a DC control signal based on an audio signal, which is utilized for controlling a flow volume provided by a fluid supplier through a proportional valve to a nozzle. The flow control signal generation device comprises an audio receiving module, a filter rectifier module, a microprocessor, and a proportional valve control signal generation module.

The audio receiving module is utilized for providing an audio signal. The filter rectifier module is electrically connected to the audio receiving module, for filtering the audio signal to generate at least one DC audio signal. The microprocessor is electrically connected to the filter rectifier module, for analyzing strength of the at least one DC audio signal within a plurality of time periods to generate a plurality of period strength values, and compares the period strength values and a predetermined attenuated strength value to generate a plurality of period attenuated values.

The proportional valve control signal generation module comprises a first low-pass filter, an attenuator, a second low-pass filter, and a first rectifier filter.

The first low-pass filter is electrically connected to the audio receiving module, for receiving and filtering the audio signal to generate a first low frequency-band signal, and the frequency of the first low frequency-band signal is under a first frequency. The attenuator is electrically connected to the first low-pass filter and the microprocessor, for attenuating a strength value of the first low frequency-band signal to a value close to the predetermined attenuated strength value based on the period attenuated values. The second low-pass filter is electrically connected to the attenuator, for receiving and filtering the first low frequency-band signal to generate a second low frequency-band signal, and the frequency of the second low frequency-band signal is under a second frequency which is smaller than the first frequency. The first rectifier filter is electrically connected to the second low-pass filter, for converting the second low frequency-band signal into a DC control signal and transmitting the DC control signal to a proportional valve to have the proportional valve adjusting opening ratio of the proportional valve based on the DC control signal.

In accordance with an embodiment of the present invention, the filter rectifier module comprises a high-pass filter and at least a rectifier filter unit. The high-pass filter is electrically connected to the audio receiving module, for receiving and filtering the volume control signal to generate a first high frequency-band signal, and the frequency of the first high frequency-band signal is above a third frequency. The rectifier filter unit is electrically connected to the high-pass filter and the microprocessor, for converting the first high frequency-band signal into at least one DC audio signal, and transmitting the at least one DC audio signal to the microprocessor.

Preferably, the filter rectifier module further comprises a first signal amplifier, which is located between the high-pass filter and the at least one rectifier filter unit, for amplifying strength of the first high frequency-band signal.

In an embodiment, the rectifier filter unit comprises a second rectifier and a second signal amplifier. The second rectifier is electrically connected to the first signal amplifier, for receiving and regulating the first high frequency-band signal. The second signal amplifier is electrically connected between the second rectifier filter and the microprocessor, for amplifying strength of the regulated first high frequency-band signal and transmitting the regulated first high frequency-band signal to the microprocessor.

In an embodiment, the rectifier filter unit comprises a third low-pass filter and a third rectifier filter. The third low-pass filter is electrically connected to the first signal amplifier, for receiving and filtering the first high frequency-band signal to limit the frequency of the first high frequency-band signal under a fourth frequency. The third rectifier filter is electrically connected to the third low-pass filter and the microprocessor, for regulating the filtered first high frequency-band signal with the frequency thereof under the fourth frequency.

In an embodiment, the rectifier filter unit comprises a band pass filter and a fourth rectifier filter. The band pass filter is electrically connected to the first signal amplifier, for receiving and filtering the first high frequency-band signal to limit the frequency of the first high frequency-band signal within a frequency range. The fourth rectifier filter is electrically connected to the band pass filter and the microprocessor, for regulating the filtered first high frequency-band signal with the frequency thereof limited in the frequency range.

A flow control apparatus is also provided in the present invention, which comprises the above mentioned flow control signal generation device for generating a DC control signal based on an audio signal and at least a proportional valve.

As mentioned above, because the flow control apparatus and the flow control signal generation device for generating the DC control signal based on the audio signal have the feature of the rectifier filter module for filtering the audio signal, the DC control signal can be generated based on the audio signal of a specific frequency band such that the proportional valve is capable to adjust the flow volume of the fluid through the proportional valve to the nozzle based on the DC control signal.

The present invention will now be specified with reference to its preferred embodiment illustrated in the following drawings.

DESCRIPTION OF THE PREFERRED EMBODIMENT

Figure 1:
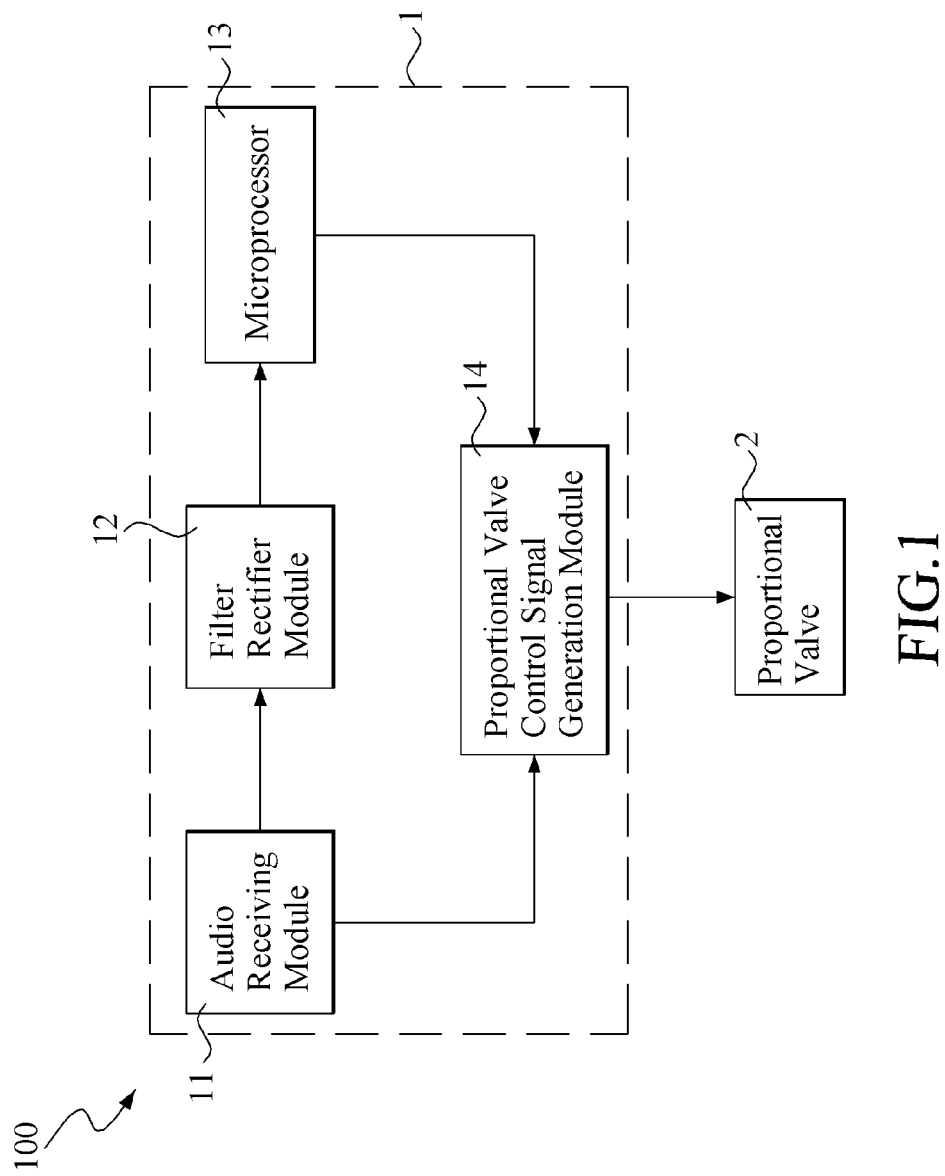
FIG. 1 is a block diagram showing the flow control signal generation device for generating a DC control signal based on an audio signal in accordance with a first preferred embodiment of the present invention.

The specific structural and functional details disclosed herein are only representative and are intended for describing exemplary embodiments of the disclosure. It is noted that, in the disclosure, similar elements would be represented by the same labels. Moreover, the drawings are for the purpose of illustration. The drawings may not be drawn based on precise proportions, and the drawing may not contain all the details.

Figure 2:
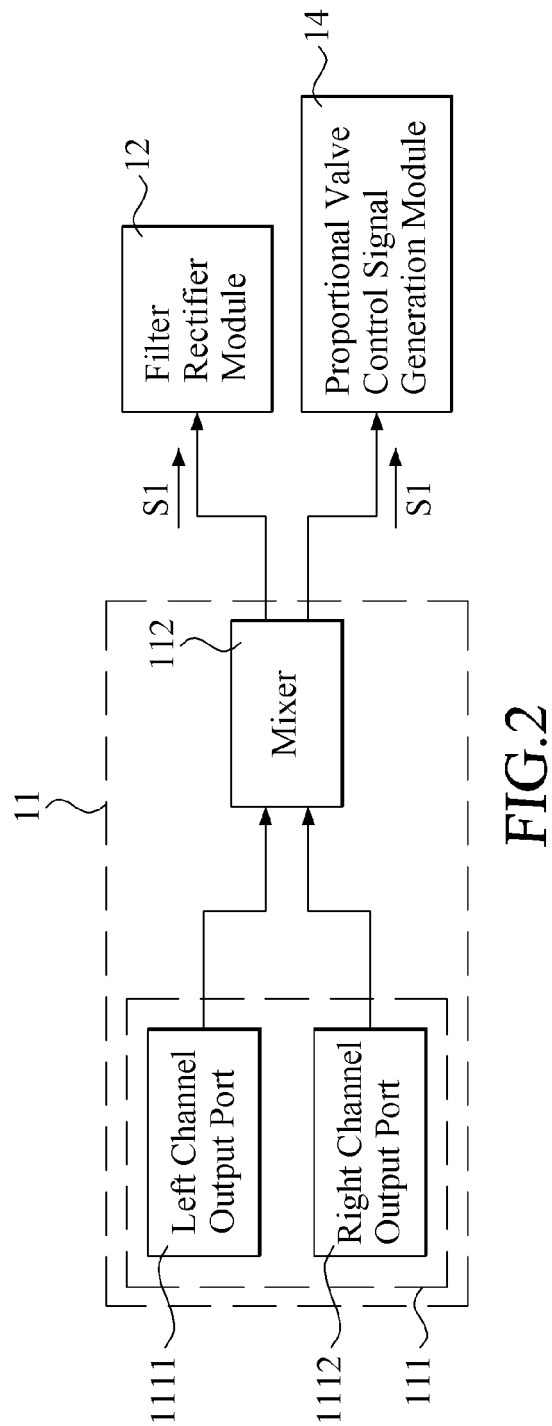
FIG. 2 is a block diagram showing the audio receiving module.
Figure 3:
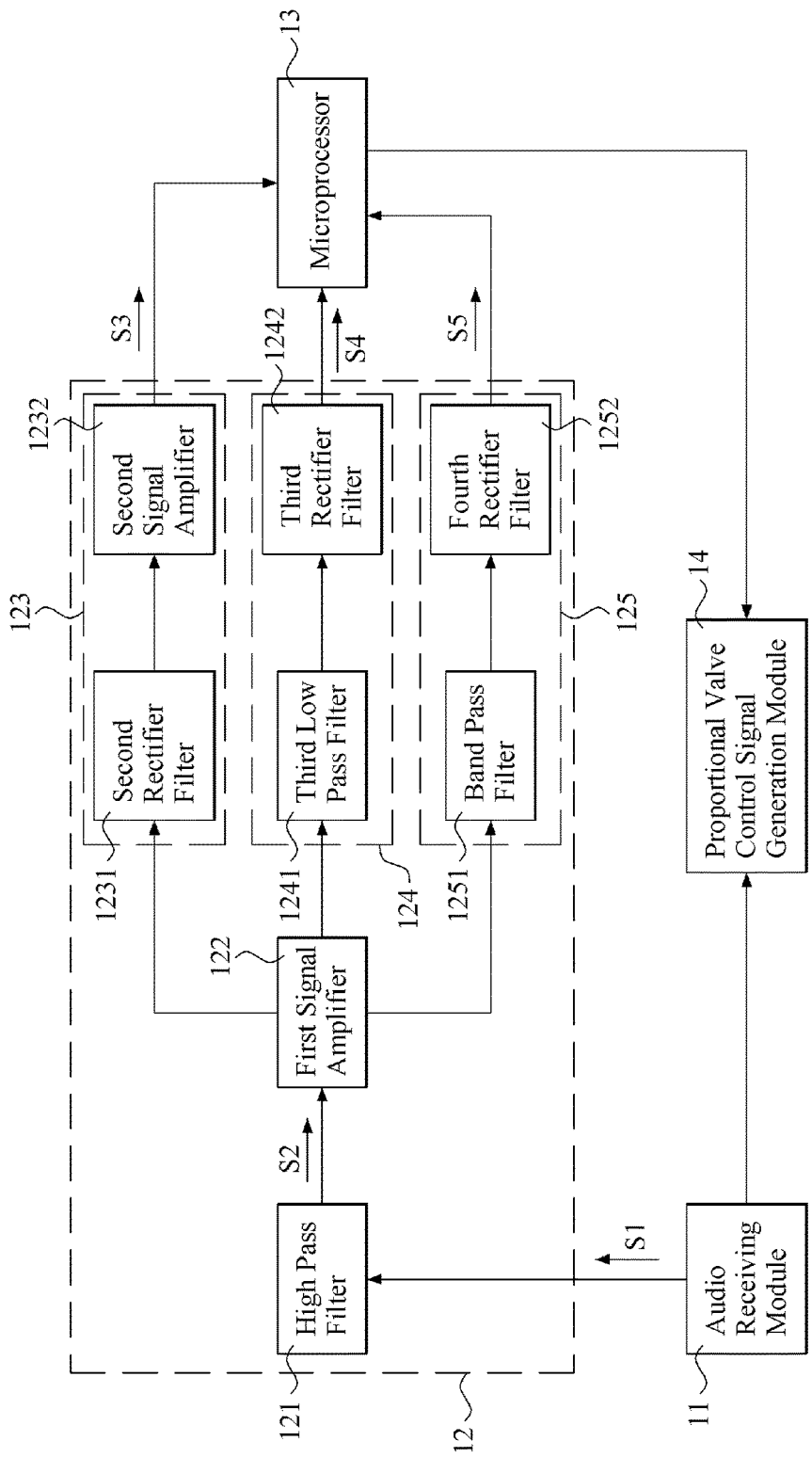
FIG. 3 is a block diagram showing the filter rectifier module.
Figure 4:
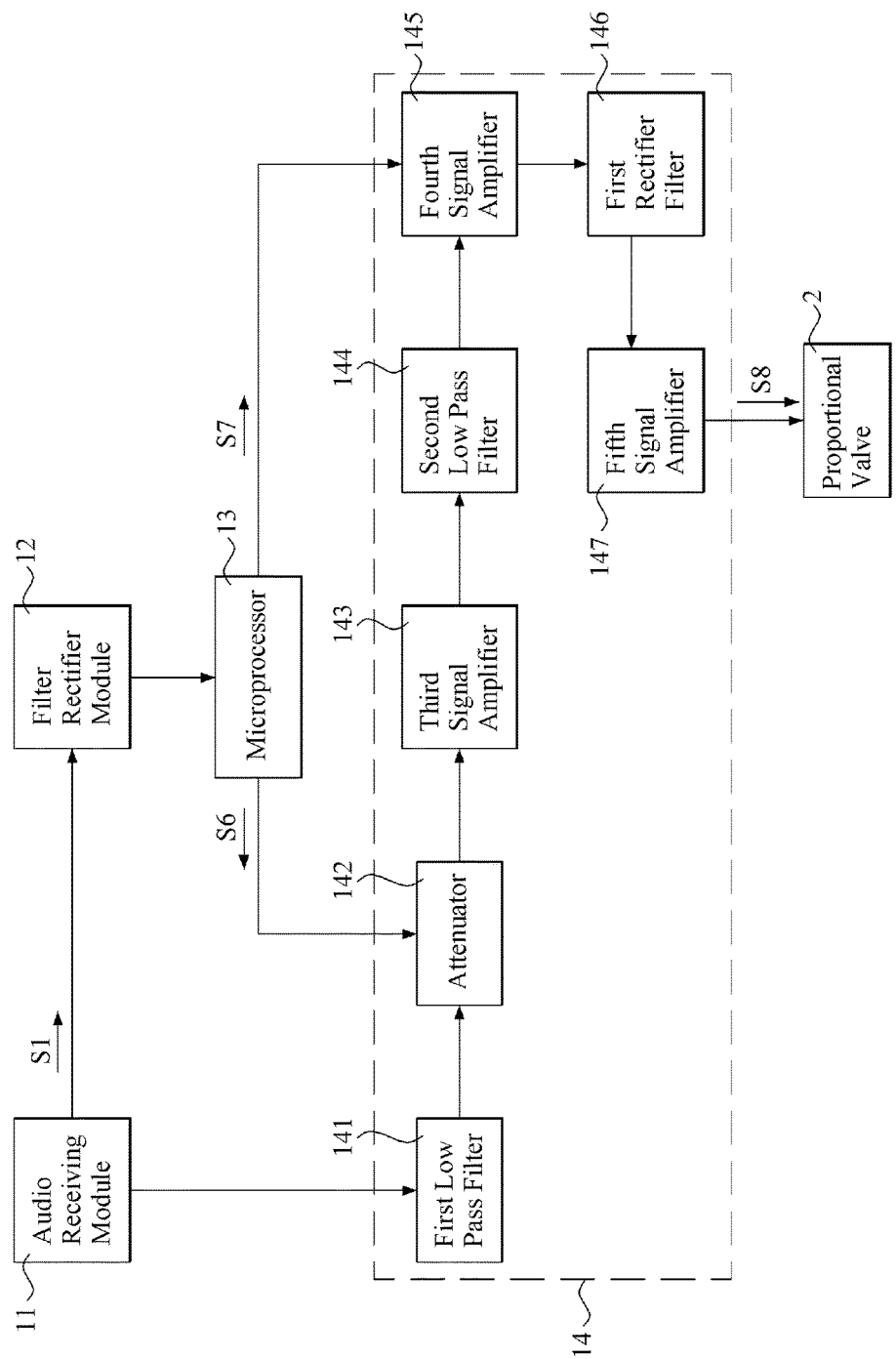
FIG. 4 is a block diagram showing the proportional valve control signal generation module.

Please refer to FIG. 1 to FIG. 4, wherein FIG. 1 is a block diagram showing the flow control signal generation device for generating a DC control signal based on an audio signal in accordance with a preferred embodiment of the present invention, FIG. 2 is a block diagram showing the audio receiving module, FIG. 3 is a block diagram showing the filter rectifier module, and FIG. 4 is a block diagram showing the proportional valve control signal generation module.

As shown, the flow control apparatus 100 includes a flow control signal generation device 1 for generating a DC control signal based on an audio signal and a proportional valve 2.

The flow control signal generation device 1 includes an audio receiving module 11, a filter rectifier module 12, a microprocessor 13 and a proportional valve control signal generation module 14.

The audio receiving module 11 is utilized for providing an audio signal S1 and includes an audio output unit 111 and a mixer 112. The audio output unit 111 includes a left channel output port 1111 and a right channel output port 1112. In practice, the audio receiving module 11 is utilized for receiving the audio source signal from Bluetooth, USB disk, radio, or wired input, and processing the audio source signal as the left channel signal and the right channel signal. The left channel signal is outputted from the left channel output port 1111, the right channel signal is outputted from the right channel output port 1112, and the mixer 112 is utilized for integrating the left channel signal and the right channel signal into an audio signal S1 to be outputted.

The filter rectifier module 12 includes a high-pass filter 121, a first signal amplifier 122, a rectifier filter unit 123, a rectifier filter unit 124, and a rectifier filter unit 125.

The high-pass filter 121 is electrically connected to the audio receiving module 11, for receiving and filtering the audio signal S1 to generate a first high frequency-band signal S2. The frequency of the first high frequency-band signal S2 is above a third frequency. The third frequency is ranged between 10 HZ and 50 HZ. Thereby, the high-pass filter 121 is capable to filter out the unwanted portions of the audio signal S1.

The first signal amplifier 122 is electrically connected to the high-pass filter 121 for receiving the first high frequency-band signal S2 and amplifying the strength of the first high frequency-band signal S2.

The rectifier filter unit 123 includes a second rectifier filter 1231 and a second signal amplifier 1232. The second rectifier filter 1231 is electrically connected to the first signal amplifier 122 for receiving the amplified first high frequency-band signal S2, and regulating and filtering the first high frequency-band signal S2. The second signal amplifier 1232 is electrically connected to the second rectifier filter 1231, for further amplifying the first high frequency-band signal S2 after being regulated and filtered by the second rectifier filter 1232, so as to generate a DC audio signal S3. The rectifier filter unit 123 regulates the first high frequency-band signal S2 to generate the DC electric signal mainly by using the second rectifier filter 1231, and further amplifies the signal strength of the electric signal by using the second signal amplifier 1232. In detail, the DC audio signal S3 is generated by filtering and smoothing the first high frequency-band signal S2 above 50 HZ using the second rectifier filter 1231, and the DC audio signal S3 is a DC voltage level.

The rectifier filter unit 124 includes a third low-pass filter 1241 and a third rectifier filter 1242. The third low-pass filter 1241 is electrically connected to the first signal amplifier 122, for receiving the amplified first high frequency-band signal S2, and regulating and filtering the first high frequency-band signal S2 to restrict the frequency of the first high frequency-band signal S2 under a fourth frequency. The third rectifier filter 1242 is electrically connected to the third low-pass filter 1241 for regulating the filtered first high frequency-band signal S2 with the frequency thereof restricted under the fourth frequency so as to generate a DC audio signal S4. The fourth frequency is ranged between 100 HZ and 400 HZ. The rectifier filter unit 124 keeps the bass beat signal mainly by using the third low-pass filter 1241, and amplifies the signal strength by using the third rectifier filter 1242.

The rectifier filter unit 125 includes a band pass filter 1251 and a fourth rectifier filter 1252. The band pass filter 1251 is electrically connected to the first signal amplifier 122 for receiving the amplified first high frequency-band signal S2, and filtering the first high frequency-band signal S2 to restrict the frequency of the first high frequency-band signal S2 within a frequency range. The fourth rectifier filter 1252 is electrically connected to the band pass filter 1251 for regulating the filtered first high frequency-band signal S2 with the frequency thereof restricted in the frequency range, so as to generate a DC audio signal S5. The lower limit of the frequency range can be ranged between 100 HZ to 300 HZ and the higher limit can be ranged between 1000 HZ and 2000 HZ so as to filter the portion with respective to the voice frequency from the first high frequency-band signal S2.

The microprocessor 13 is electrically connected to the second signal amplifier 1232, the third rectifier filter 1242 and the fourth rectifier filter 1252, for analyzing the strength of the DC audio signals S3, S4, and S5 within a plurality of time periods to generate a plurality of period strength values, and comparing the period strength values and a predetermined attenuated strength value to generate a plurality of period attenuated values S6. The microprocessor 13 uses the DC voltage level as a reference of gain control for the dynamic range of the audio signal S1. In addition, as the microprocessor 13 determines that the DC audios signal S5 with respective to voice frequency is smaller than the DC audio signal S4 with respective to bass beat by comparing the DC audio signal S4 and the DC audio signal S5, the microprocessor 13 may further control the rectifier filter unit 125 to minorly attenuate the signal (such as the attenuation of 3 dB, wherein dB is the unit of power gain defined by 10*log (P2/P1), P1 is the value before attenuation, and P2 is the value after attenuation) when filtering and regulating the first high frequency-band signal S2 to generate the DC audio signal S5, so as to prevent the large voice signal from interfering the determination of rhythm change.

As shown in the following table 1, take the rectifier filter unit 123 as an example, as the plurality of time periods are sectioned every 1 second and the predetermined attenuated strength value is −25 dB, the period attenuated value with respective to each of the time periods can be calculated as below.

TABLE 1

| time period (second) | DC audio signal S3 (dB) | predetermined attenuated strength value (dB) | period attenuated value S6 (dB) |
| --- | --- | --- | --- |
| 0-1 | −8 | −25 | −17 |
| 1-2 | −7 | −25 | −18 |
| 2-3 | −7 | −25 | −18 |
| 3-4 | −8 | −25 | −17 |
| 4-5 | −9 | −25 | −16 |
| 5-6 | −8 | −25 | −17 |
| 6-7 | −9 | −25 | −16 |
| 7-8 | −10 | −25 | −15 |
| 8-9 | −11 | −25 | −14 |
| 9-10 | −12 | −25 | −13 |
| 10-11 | −10 | −25 | −15 |
| 11-12 | −8 | −25 | −17 |
| 12-13 | −8 | −25 | −17 |
| 13-14 | −7 | −25 | −18 |
| 14-15 | −8 | −25 | −17 |

The proportional valve control signal generation module 14 includes a first low-pass filter 141, an attenuator 142, a third signal amplifier 143, a second low-pass filter 144, a fourth signal amplifier 145, a first rectifier filter 146, and a fifth signal amplifier 147.

The first low-pass filter 141 is electrically connected to the audio receiving module 11, for receiving and filtering the audio signal S1 to generate a first low frequency-band signal. The frequency of the first low frequency-band signal is under 6000 HZ.

The attenuator 142 is electrically connected to the first low-pass filter 141 and the microprocessor 13, for attenuating the strength value of the first low frequency-band signal to the value close to the predetermined attenuated strength value based on the period attenuated value S6. For example, as shown in table 1, during the time period 0-1 (second), the period attenuated value S6 would be −17 dB, and thus the strength value of the first low frequency-band signal would be close to the predetermined attenuated strength value (−25 dB) after being attenuated.

The third signal amplifier 143 is electrically connected to the attenuator 142 for amplifying the strength value of the attenuated first low frequency-band signal.

The second low-pass filter 144 is electrically connected to the third signal amplifier 143 for receiving and filtering the first low frequency-band signal, so as to generate a second low frequency-band signal. The frequency of the second low frequency-band signal in the present embodiment is 200 HZ, and the attenuation of the strength value of the first low frequency-band signal is 3.5 dB.

The fourth signal amplifier 145 is electrically connected to the second low-pass filter 144 for amplifying the strength value of the second low frequency-band signal. In addition, the fourth signal amplifier 145 is also electrically connected to the microprocessor 13. The microprocessor 13 will transmit a static flame height control signal S7 to the fourth signal amplifier 145 if none of the DC audio signals S3, S4, and S5 was received.

The first rectifier filter 146 is electrically connected to the fourth signal amplifier 145 for regulating and filtering the second low frequency-band signal to generate a DC control signal S8. In practice, the first rectifier filter 146 is a positive half-wave rectifier filter, and the DC control signal S8 is the DC signal after being regulated and filtered.

The proportional valve 2 is electrically connected to the fifth signal amplifier 147 for receiving the DC control signal S8 and controlling the opening ratio of the proportional valve based on the DC control signal S8.

Figure 5:
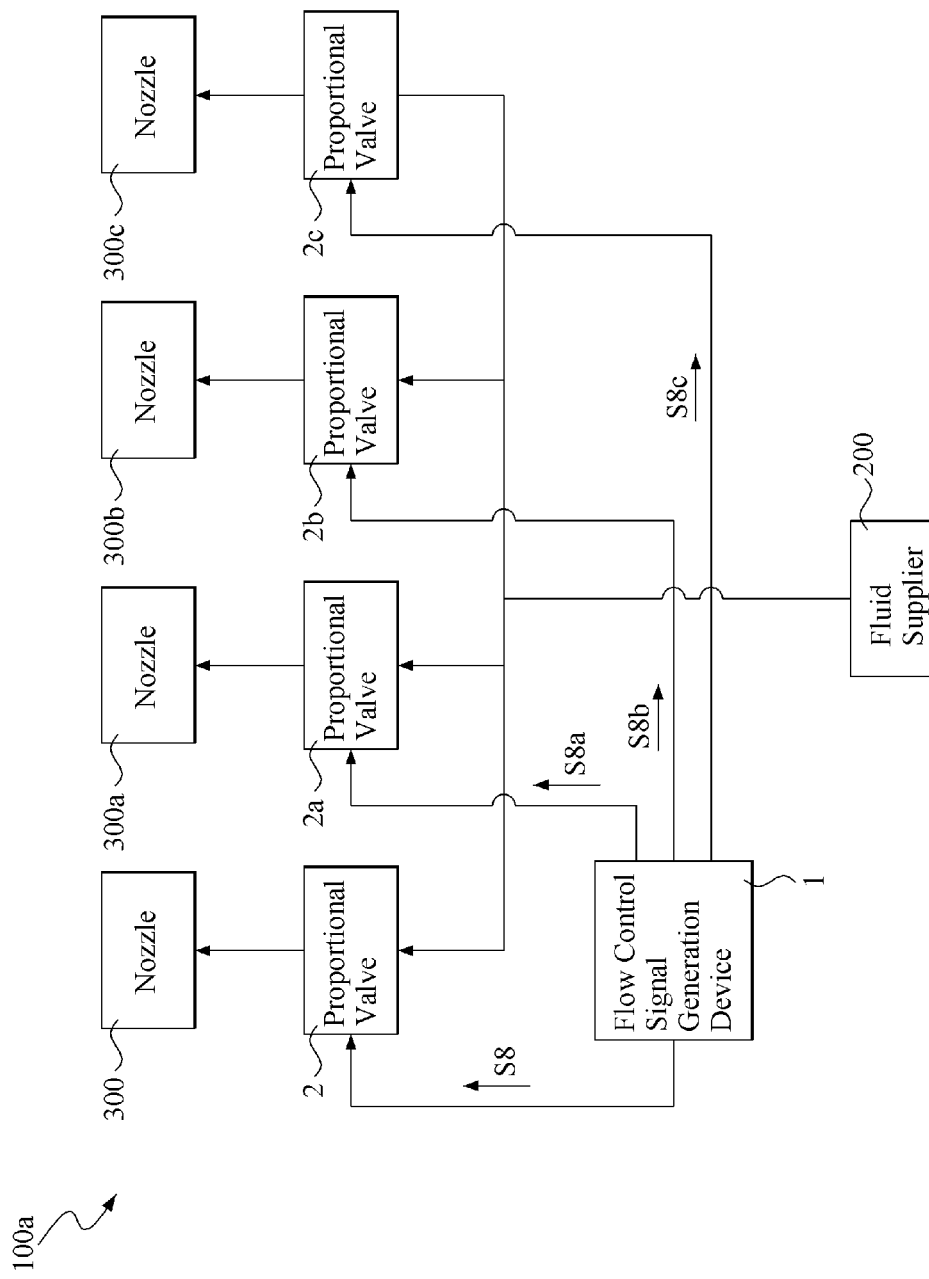
FIG. 5 is a schematic view of a flow control apparatus provided in accordance with a second preferred embodiment of the present invention.

Please refer to FIG. 5, which is a schematic view of a flow control apparatus provided in accordance with a second preferred embodiment of the present invention. As shown, the flow control apparatus 100a includes the above mentioned flow control signal generation device 1 and four proportional valves 2, 2a, 2b, and 2c. The proportional valves 2a, 2b, and 2c are similar to the proportional valve 2 mentioned above. Thus, the flow control signal generation device 1 would generate and transmit four DC control signals S8, S8a, S8b, and S8c to the proportional valves 2, 2a, 2b, and 2c respectively to have the proportional valves 2, 2a, 2b, and 2c adjust the opening ratio thereof based on the DC control signals S8, S8a, S8b, and S8c respectively such that the fluid supplied by the fluid supplier 200 to the nozzles 300, 300a, 300b, and 300c can be simultaneously controlled. In practical application, the fluid supplied by the fluid supplier 200 can be a flammable gas or a liquid. As the fluid is a flammable gas, the flow control apparatus can be applied to the performance of fire dance, and as the fluid is a liquid, the flow control apparatus can be applied to the performance of water dance.

In conclusion, because the flow control apparatus and the flow control signal generation device for generating the DC control signal based on the audio signal have the feature of the filter rectifier module for filtering the audio signal, the DC control signal can be generated based on the audio signal of a specific frequency band such that the proportional valve is capable to adjust the flow volume of the fluid through the proportional valve to the nozzle based on the DC control signal.

While the present invention has been particularly shown and described with reference to a preferred embodiment, it will be understood by those skilled in the art that various changes in form and detail may be without departing from the spirit and scope of the present invention.

What is claimed is:

1. A flow control signal generation device for generating a DC control signal based on an audio signal, utilized for controlling a flow volume provided by a fluid supplier through a proportional valve to a nozzle, and the flow control signal generation device comprising:
    an audio receiving module, for providing an audio signal;
    a filter rectifier module, electrically connected to the audio receiving module, for filtering the audio signal to generate at least one DC audio signal;
    a microprocessor, electrically connected to the filter rectifier module, for analyzing strength of the at least one DC audio signal within a plurality of time periods to generate a plurality of period strength values, and comparing the period strength values and a predetermined attenuated strength value to generate a plurality of period attenuated values; and
    a proportional valve control signal generation module, comprising:
        a first low-pass filter, electrically connected to the audio receiving module, for receiving and filtering the audio signal to generate a first low frequency-band signal, and a frequency of the first low frequency-band signal being under a first frequency;
        an attenuator, electrically connected to the first low-pass filter and the microprocessor, for attenuating a strength value of the first low frequency-band signal to a value close to the predetermined attenuated strength value based on the period attenuated values;
        a second low-pass filter, electrically connected to the attenuator, for receiving and filtering the first low frequency-band signal to generate a second low frequency-band signal, and a frequency of the second low frequency-band signal being under a second frequency which is smaller than the first frequency; and
        a first rectifier filter, electrically connected to the second low-pass filter, for converting the second low frequency-band signal into a DC control signal and transmitting the DC control signal to a proportional valve to have the proportional valve adjusting opening ratio of the proportional valve based on the DC control signal.

2. The flow control signal generation device for generating a DC control signal based on an audio signal of claim 1, wherein the filter rectifier module comprises:
    a high-pass filter, electrically connected to the audio receiving module, for receiving and filtering the audio signal to generate a first high frequency-band signal, and a frequency of the first high frequency-band signal being above a third frequency; and
    at least a rectifier filter unit, electrically connected to the high-pass filter and the microprocessor, for converting the first high frequency-band signal into at least one DC audio signal, and transmitting the at least one DC audio signal to the microprocessor.

3. The flow control signal generation device for generating a DC control signal based on an audio signal of claim 2, wherein the filter rectifier module further comprises a first signal amplifier, located between the high-pass filter and the at least one rectifier filter unit, for amplifying strength of the first high frequency-band signal.

4. The flow control signal generation device for generating a DC control signal based on an audio signal of claim 3, wherein the at least one rectifier filter unit comprises:
    a second rectifier filter, electrically connected to the first signal amplifier, for receiving and regulating the first high frequency-band signal; and
    a second signal amplifier, electrically connected between the second rectifier filter and the microprocessor, for amplifying strength of the regulated first high frequency-band signal and transmitting the regulated first high frequency-band signal to the microprocessor.

5. The flow control signal generation device for generating a DC control signal based on an audio signal of claim 3, wherein the at least one rectifier filter unit comprises:
    a third low-pass filter, electrically connected to the first signal amplifier, for receiving and filtering the first high frequency-band signal to limit a frequency of the first high frequency-band signal under a fourth frequency; and
    a third rectifier filter, electrically connected to the third low-pass filter and the microprocessor, for regulating the filtered first high frequency-band signal with the frequency thereof under the fourth frequency.

6. The flow control signal generation device for generating a DC control signal based on an audio signal of claim 3, wherein the at least one rectifier filter unit comprises:
    a band pass filter, electrically connected to the first signal amplifier, for receiving and filtering the first high frequency-band signal to limit a frequency of the first high frequency-band signal within a frequency range; and
    a fourth rectifier filter, electrically connected to the band pass filter and the microprocessor, for regulating the filtered first high frequency-band signal with the frequency thereof limited in the frequency range.

7. A flow control apparatus, comprising:
    a flow control signal generation device for generating a DC control signal based on an audio signal, comprising:
        an audio receiving module, for providing an audio signal;
        a filter rectifier module, electrically connected to the audio receiving module, for filtering the audio signal to generate at least one DC audio signal;
        a microprocessor, electrically connected to the filter rectifier module, for analyzing strength of the at least one DC audio signal within a plurality of time periods to generate a plurality of period strength values, and comparing the period strength values and a predetermined attenuated strength value to generate a plurality of period attenuated values; and
        a proportional valve control signal generation module, comprising:
            a first low-pass filter, electrically connected to the audio receiving module, for receiving and filtering the audio signal to generate a first low frequency-band signal, and a frequency of the first low frequency-band signal being under a first frequency;

an attenuator, electrically connected to the first low-pass filter and the microprocessor, for attenuating a strength value of the first low frequency-band signal to a value close to the predetermined attenuated strength value based on the period attenuated values;

a second low-pass filter, electrically connected to the attenuator, for receiving and filtering the first low frequency-band signal to generate a second low frequency-band signal, and a frequency of the second low frequency-band signal being under a second frequency which is smaller than the first frequency; and a first rectifier filter, electrically connected to the second low-pass filter, for converting the second low frequency-band signal into a DC control signal; and at least a proportional valve, connected between a fluid supplier and at least one nozzle, and electrically connected to the proportional valve control signal generation module for receiving the DC control signal, and the at least one proportional valve controlling a flow volume provided by the fluid supplier through the at least one proportional valve to the at least one nozzle based on the DC control signal.

8. The flow control apparatus of claim 7, wherein the filter rectifier module comprises:

a high-pass filter, electrically connected to the audio receiving module, for receiving and filtering the volume control signal to generate a first high frequency-band signal, and a frequency of the first high frequency-band signal being above a third frequency; and at least a rectifier filter unit, electrically connected to the high-pass filter and the microprocessor, for converting the first high frequency-band signal into at least one DC audio signal, and transmitting the at least one DC audio signal to the microprocessor.

9. The flow control apparatus of claim 7, wherein the filter rectifier module further comprises a first signal amplifier, located between the high-pass filter and the at least one rectifier filter unit, for amplifying strength of the first high frequency-band signal.

10. The flow control apparatus of claim 9, wherein the at least one rectifier filter unit comprises:

a second rectifier filter, electrically connected to the first signal amplifier, for receiving and regulating the first high frequency-band signal; and a second signal amplifier, electrically connected between the second rectifier filter and the microprocessor, for amplifying strength of the regulated first high frequency-band signal and transmitting the regulated first high frequency-band signal to the microprocessor.

11. The flow control apparatus of claim 9, wherein the at least one rectifier filter unit comprises:

a third low-pass filter, electrically connected to the first signal amplifier, for receiving and filtering the first high frequency-band signal to limit a frequency of the first high frequency-band signal under a fourth frequency; and a third rectifier filter, electrically connected to the third low-pass filter and the microprocessor, for regulating the filtered first high frequency-band signal with the frequency thereof under the fourth frequency.

12. The flow control apparatus of claim 9, wherein the at least one rectifier filter unit comprises:

a band pass filter, electrically connected to the first signal amplifier, for receiving and filtering the first high frequency-band signal to limit a frequency of the first high frequency-band signal within a frequency range; and a fourth rectifier filter, electrically connected to the band pass filter and the microprocessor, for regulating the filtered first high frequency-band signal with the frequency thereof limited in the frequency range.

* * * * *